Aug. 6, 1968  H. HEINEN  3,395,842

FILM ADVANCING MECHANISM

Filed March 27, 1967

INVENTOR.

HANS HEINEN

BY Michael E. Striker,
Attorney

3,395,842
FILM ADVANCING MECHANISM
Hans Heinen, Munich, Germany, assignor to Agfa-Gevaert Aktiengesellschaft, Leverkusen, Germany
Filed Mar. 27, 1967, Ser. No. 626,116
Claims priority, application Germany, Apr. 6, 1966,
A 52,094
14 Claims. (Cl. 226—62)

ABSTRACT OF THE DISCLOSURE

A film advancing mechanism for movie cameras or projectors wherein a tooth at one end of an arm is oscillatable along a straight line in parallelism with the direction of film travel. The other end of the arm is pivotable about an axis which is reciprocable substantially at right angles to the direction of film travel under or against the bias of a prestressed leaf spring which urges the arm against a driven cam serving to oscillate and to effect in and out movements of the tooth. The deformation of the leaf spring increases in response to travel of the tooth during the pulldown portion of the cycle whereby the change in the effective length of the spring suffices to maintain the tooth in a straight path.

Background of the invention

The present invention relates to an intermittent film advancing mechanism which can be utilized in a movie camera or movie projector. More particularly, the invention relates to improvements in so-called claw pulldowns for movie film.

It is already known to reduce the noise and friction by mounting the claw element or arm of a pulldown for movie film on a spring so that the arm pivots about a fixed axis but need not be fixedly mounted on a shaft or the like. During the pulldown portion of each cycle, i.e., when the tooth of the arm has entered a perforation and advances the film lengthwise by an increment corresponding to the distance between the centers of two successive film frames, the tooth travels along an arc whose center of curvature is located on the pivot axis of the arm. In other words, the arcuate path of the tooth deviates from the straight path of the perforation and, therefore, the tooth travels sideways with reference to the film and rubs against the edge surface at the leading end of the perforation. Consequently, the width of the tooth must be less than the width of perforations, at least by a distance which corresponds to the divergence between the arcuate path of the tooth during the pulldown portion of the cycle and the straight path of the film. In order to avoid tearing of film during engagement with and acceleration of a relatively narrow tooth, the interval necessary to complete the pulldown portion of the cycle must be longer than desirable. On the other hand, it is highly advantageous to reduce the pulldown portion to a minimum because this reduces flickering and results in more economical utilization of light.

Proposals to avoid such sliding movement of the tooth with reference to the leading edge of film in a perforation include the provision of specially constructed pulldowns wherein the tooth reciprocates along a straight line and is mounted on a slider, cam or link train. Such solutions are not entirely satisfactory because the pulldown produces too much noise and occupies too much room. Furthermore, the mechanism is expensive, its inertia is relatively high, and the wear upon its parts is excessive.

Accordingly, it is an important object of the present invention to provide a compact, substantially noiseless and relatively inexpensive intermittent film advancing mechanism which can be utilized in movie cameras or movie projectors and wherein the tooth of the claw element or arm is pivotally supported in the housing but nevertheless travels in a substantially straight path in parallelism with the direction of film travel so that its lateral displacement with reference to the film during the pulldown portion of each cycle is negligible.

Another object of the invention is to provide a novel pivot structure for the claw element or arm of an intermittent film advancing mechanism for movie cameras or movie projectors.

A further object of the instant invention is to provide a pulldown mechanism for movie film wherein the biasing means which urges the claw element against the oscillating cam simultaneously insures that the tooth of the claw element reciprocates in a substantially straight path to avoid damage to or tearing of the film in the region of perforations.

An additional object of the invention is to provide a novel mounting for the biasing means.

A concomitant object of the invention is to provide a film advancing mechanism which can be readily adjusted to insure that the pulldown portion of each cycle will result in placing a film frame into exact registry with the film gate.

Still another object of the invention is to provide a film advancing mechanism which can be incorporated in movie cameras or movie projectors of presently known design.

An ancillary object of the invention is to provide a film advancing mechanism wherein the wear on moving parts is negligible and wherein the throw of the claw element may be regulated within a wide range.

Summary of the invention

One feature of my invention resides in the provision of an intermittent film advancing mechanism which can be used as a substitute for a conventional claw pulldown. The advancing mechanism comprises a claw element or arm which is pivotable at one end and is oscillatable at the other end, a tooth or analogous film engaging means provided at the other end of the arm and movable into and from engagement with the film in response to oscillation caused by pivoting of the arm, oscillating means for pivoting the arm about its one end, pivot means defining a movable pivot axis for the one end of the arm, and shifting means for reciprocating the one end of the arm through increments of such magnitude that the film engaging means oscillates along a substantially straight line. The shifting means comprises resilient biasing means which preferably includes a prestressed leaf spring one end of which is pivotable about a fixed point and the other end of which biases the one end of the arm into engagement with the pivot means as well as into engagement with the oscillating means. During forward travel of the film engaging means, i.e., during the pulldown portion of a cycle, the deformation of the leaf spring increases whereby the resulting change in the effective length of the spring suffices to compensate for the tendency of the film engaging means to travel in an arcuate path, i.e., to compel the film engaging means to travel along a straight line which is parallel to the direction of film travel in a movie camera or movie projector.

The novel features which are considered as characteristic of the invention are set forth in particular in the appended claims. The improved film advancing mechanism itself, however, both as to its construction and its mode of operation, together with additional features and advantages thereof, will be best understood upon perusal of the following detailed description of certain specific embodiments with reference to the accompanying drawing.

Description of the preferred embodiments

Figure 1:
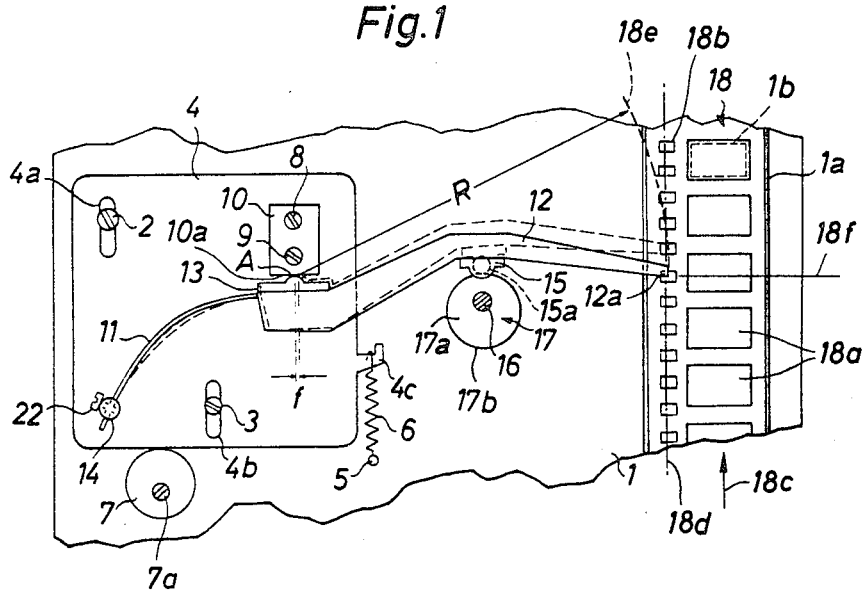
FIG. 1 is a side elevational view of a film advancing mechanism which embodies one form of my invention.

Referring first to FIG. 1, there is shown a portion of a movie camera or movie projector which comprises a housing or main support 1 defining a film channel 1a for a movie film 18. The frames of the film are denoted by the numeral 18a and its perforations by the numeral 18b. The housing 1 has a window or gate 1b which must register with the successive film frames 18a when the camera is to make an exposure or when the projector is to project the image of the respective frame onto a screen.

The housing supports an adjustable mounting block 4 which is formed with elongated slots 4a, 4b extending in parallelism with the film channel 1a and receiving the stems of screws 2, 3 or analogous fasteners which secure the mounting block to the housing 1 in such a way that the mounting block may be adjusted in parallelism with the direction of film travel in the channel 1a. The adjusting means comprises a disk-shaped eccentric cam 7 which is turnable with its shaft 7a relative to the housing 1, and a spring 6 which biases the lower edge of the mounting block 4 against the peripheral face of the cam 7. The spring 6 is attached to a post 5 of the housing 1 and to a hook 4c of the mounting block 4. The shaft 7a is provided with a knob or a like actuating member (not shown) which can be turned by hand so as to move the mounting block 4 up or down and to thereby insure accurate registry of successive frames 18a with the window 1b of the housing 1.

The film advancing mechanism comprises an elongated claw element or arm 12 the left-hand end of which is pivotable about an axis A defined by pivot means provided on the mounting block 4. The pivot means comprises a small plate-like pivot member 10 which is affixed to the mounting block 4 by means of screws 8, 9 and has a straight edge face 10a extending substantially at right angles to the film channel 1a. The left-hand end of the arm 12 carries a small follower 13 which preferably consists of suitable wear-resistant synthetic plastic material and is biased against the edge face 10a by a shifting means here shown as a prestressed resilient element in the form of an arcuate leaf spring 11. The follower 13 may be bonded directly to the arm 12 or is secured thereto by rivets or the like.

One end portion of the leaf spring 11 is fixed in that it is normally held against movement toward or away from the film channel 1a but is turnable about the axis of a pivot pin 14 rotatably journalled in the mounting block 4. A screw 22 serves to affix the spring 11 to the pivot pin 14. The spring 11 will store more energy when it assumes the broken-line position of FIG. 1, i.e., it will dissipate energy in response to movement from the broken-line to the solid-line position whereby its curvature increases. In other words, were the spring 11 free to assume its unstressed position, its curvature would exceed that which is shown by solid lines. The spring will store energy when the film-engaging tooth 12a at the right-hand end of the arm 12 moves in the direction of film travel (arrow 18c) and extends into a given perforation 18b to advance the film through an increment necessary to place the next-following frame 18a into registry with the window 16. The tooth 12a then travels from the solid-line position to the broken-line position of FIG. 1, and the pivot axis A travels in a direction to the right by an increment F, i.e., the follower 13 slides along the edge face 10a of the cam 10 in a direction toward the film channel 1a.

The leaf spring 11 tends to turn the arm 12 in a clockwise direction, as viewed in FIG. 1, and thereby maintains a follower 15a on an intermediate portion of the arm in permanent engagement with the peripheral face 17b of an oscillating cam or oscillator cam 17 which is mounted on a shaft 16 carried by the housing 1. The follower 15b is bonded or riveted to the arm 12 and preferably consists of wear-resistant synthetic plastic material. The shaft 16 may constitute the diaphragm shaft of a movie camera or projector and is connected with certain other parts of the camera or projector in a manner well known from the art of such apparatus.

The oscillating cam 17 comprises a portion having a cam face 17a and constituting a well known in-and-out cam for the tooth 12a. The face 17a is tracked by a second follower 15 which is preferably integral with the follower 15a and is urged against the cam face 17a by a conventional spring which is not shown in the drawing. In-and-out movements of the tooth 12a cause some twisting of the leaf spring 11 and simultaneous lateral displacements of the follower 13 with reference to the edge face 10a in directions substantially at right angles to the plane of FIG. 1. The leaf spring 11 untwists itself when the tooth 12a enters a perforation 18b and travels with the film 18 in the direction indicated by arrow 18c.

The face 17b of the oscillating cam 17 causes the tooth 12a to travel back and forth between the solid-line and broken-line positions of FIG. 1. Such oscillatory movements of the tooth 12a take place in response to pivoting of the arm 12 about the axis A, and this axis travels back and forth (toward and away from the film channel 1a) in response to flexing and unflexing of the leaf spring 11. Were the pivot axis A fixed, the tooth 12a would travel in an arcuate path whose radius of curvature is indicated at R, and such fixed pivot axis would cause the tooth 12a to move in a path which is not exactly parallel with the direction of film travel (arrow 18c). In order to insure that the tooth 12a will reciprocate in a substantially straight path indicated by the straight line 18d, flexing of the leaf spring 11 in a sense to reduce its curvature causes the pivot axis A to move to the right by travelling along the edge face 10a and to thus compensate for such component of movement of the tooth 12a which is due to pivotal mounting of the arm 12. It will be seen that, in the film advancing mechanism of FIG. 1, the tooth 12a assumes its rightmost position when it begins to engage the film 18 (as shown by solid lines) and that it thereupon tends to move in a direction to the left in order to follow the arcuate path 18e. However, and since such pivotal movement of the arm 12 results in flattening of the leaf spring 11 from the solid-line to the broken-line position, the effective length of the spring increases and the tooth 12a is compelled to advance the film 18 by moving along the straight line 18d, i.e., the tooth 12a is caused to leave the path 18e and to move in parallelism with the direction indicated by the arrow 18c. The extent to which the effective length of the leaf spring 11 increases is indicated at f. By proper selection of the radius R and of the initial curvature of the leaf spring 11, the increment or distance f will at least approximate the divergence between the lines 18d, 18e during oscillation of the tooth 12a in response to rotation of the cam 17.

In FIG. 1, a straight line 18f passing through the pivot axis A and intersecting the line 18d at right angles is located substantially at (or can be located past) the point where the tooth 12a enters a perforation 18b (see the solid-line position of the tooth 12a), as seen in the direction of arrow 18c. Therefore, and were the pivot axis A fixed, the tooth 12a would travel upwardly and to the left, as viewed in FIG. 1, in response to movement from the solid-line to the broken-line position and would follow the arcuate line 18e. The curvature of the leaf spring 11 increases during return movement of the tooth 12a to the solid-line position and, therefore, the pivot axis A then travels to the left by the same increment f.

Due to the fact that the left-hand portion of the leaf spring 11 is turnable about the axis of the pivot pin 14, the effective length of the spring varies in response to oscillation of the tooth 12a. Were the pivot pin 14 replaced by a non-rotatable holder for the spring 11, the latter would tend to assume an undulate shape in response to oscillation of the tooth 12a and it could happen that the effective length of the spring would remain unchanged, i.e., the pivot axis A would remain in a given position and the tooth 12a would oscillate in the arcuate path 18e so that it would rub against the leading edge of the film in that perforation 18b which happens to receive the tooth during the pulldown portion of a cycle.

The followers 13, 15 and 15a insure that the operation of the film advancing mechanism is practically noiseless, and the inertia of the arm 12 is negligible. Furthermore, the wear is also negligible because the arm 12 is suspended only on the leaf spring 11. The distance f is very small so that the follower 13 travels along a very small portion of the edge face 10a.

Since the spring 11 is supported by the mounting block 4 which also carries the pivot member 10, the bias of the spring 11 remains substantially unchanged when the mounting block is adjusted in response to rotation of the eccentric cam 7. The length of slots 4a, 4b and the eccentricity of the cam 7 are selected in such a way that the window 1b can be placed into accurate registry with a film frame 18a when the tooth 12a assumes one of its end positions, either prior or subsequent to completion of the pulldown portion of a cycle.

Figure 2:
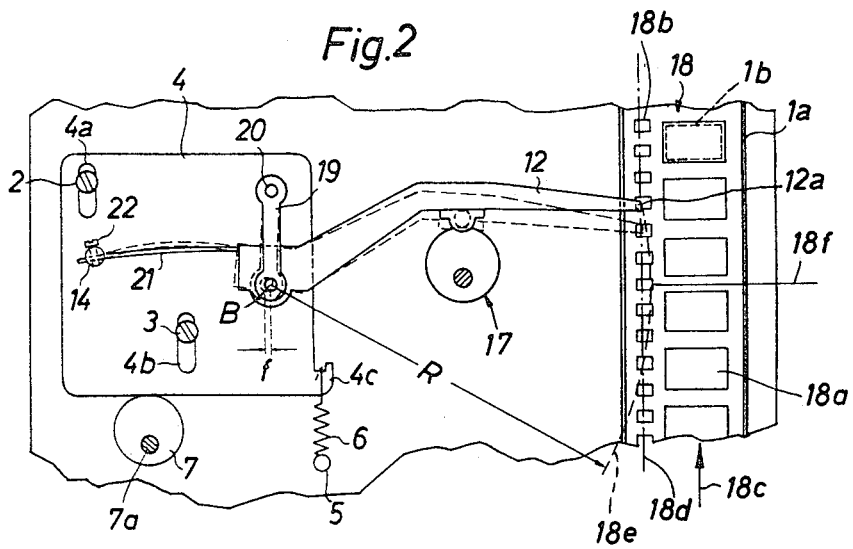
FIG. 2 is a side elevational view of a second film advancing mechanism.

FIG. 2 illustrates a second film advancing mechanism wherein the parts corresponding to those shown in FIG. 1 are denoted by similar reference characters. The left-hand end of the arm 12 is articulately connected with the lower end of a link 19 which defines a movable pivot axis B. The upper end of the link 19 is turnable on a pin 20 provided on the mounting block 4. The pivot means of the second film advancing mechanism is constituted by the link 19 and by the pivot pin which connects it to the left-hand end of the arm 12. The curvature of the leaf spring 21 decreases in response to travel of the tooth 12a in the direction of arrow 18c and, therefore, the effective length of the spring 21 is increased whereby the pivot axis B moves in a direction to the right and causes the tooth 12a to travel along the straight line 18d. Such mounting of the spring 21 is necessary because, were the pivot axis B fixed, the tooth 12a would move in a direction to the left in response to pivoting of arm 12 from the broken-line to the solid-line position of FIG. 2. The character f again denotes the change in effective length of the spring 21 in response to pivoting of the arm 12 from the solid-line to the broken-line position or vice versa. The distance f is sufficient to change the direction of travel of the tooth 12a so that the latter follows the line 18d and need not slide along the edge of that perforation 18b into which the tooth extends during movement from the broken-line to the solid-line position. The manner in which the cam 17 oscillates and reciprocates the arm 12 in order to move the tooth 12a into and out of engagement with the film 18 is the same as described in connection with FIG. 1.

In the embodiment of FIG. 2, a straight line 18f passing through the pivot axis B and making a right angle with the line 18d intersects the latter in a point which is located well ahead of the point where the tooth 12a enters a perforation 18b, as seen in the direction of arrow 18c. Therefore, the effective length of the spring 21 must increase during advance of the film 18 in order to insure that the tooth 12a travels along the line 18d.

In each of the illustrated embodiments, the leaf spring 11 or 21 will become flatter when the tooth 12a advances the film 18 in the direction of the arrow 18c. This is due to the fact that the tooth 12a is located at or past the point of intersection between the lines 18d, 18f. Were the tooth 12a located ahead of such point, the spring 11 or 21 would have to pull the arm 12 in a direction to the left whenever the tooth would advance the film 18 by the length of a frame. Thus, whether the effective length of the spring 11 or 21 will increase or decrease in response to forward movement of the tooth 12a will depend on the position of the tooth with reference to the line 18f. Were the arm 12 of FIG. 2 located at a level below the cam 17, the spring 21 would have to pull the tooth 12a in a direction to the left in response to upward travel of the tooth. Thus, the spring 21 would be substantially straight at the time it would store less energy (i.e., it would be necessary to bend it in order to increase its bias). An advantage of the embodiment which is illustrated in FIG. 2 is that, in one of its end positions, the leaf spring 21 is substantially straight. This is desirable for manufacturing purposes and also because the bias of the spring can be determined in a simpler and more economical manner.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptions should and are intended to be comprehended within the meaning and range of equivalence of the claims.

What is claimed as new and desired to be protected by Letters Patent is set forth in the appended claims.

I claim:

1. An intermittent film advancing mechanism, comprising an arm pivotable at one end and oscillatable at the other end thereof; film engaging means provided at the other end of said arm; oscillating means for pivoting the arm about said one end to thereby oscillate said film engaging means; pivot means defining a movable pivot axis for said one end of the arm; and shifting means for reciprocating said pivot axis in response to pivotal movement of said one end through increments of such magnitude that said film engaging means oscillates along a substantially straight line, said shifting means comprising resilient means having a fixed portion and a second portion coupled to said one end of the arm.

2. A film advancing mechanism as defined in claim 1, wherein said oscillating means comprises a follower provided on an intermediate portion of said arm and a rotary cam cooperating with said follower.

3. A film advancing mechanism as defined in claim 1, further comprising in-and-out cam means for oscillating said film engaging means in a direction substantially at right angles to said straight line in response to pivotal movement of said arm about said one end thereof.

4. A film advancing mechanism as defined in claim 1, further comprising housing means supporting said pivot means and said oscillating means, said resilient means comprising a prestressed leaf spring whose fixed portion is turnably secured to said housing means.

5. A film advancing mechanism as defined in claim 1, wherein said pivot means comprises a fixed pivot member and wherein said resilient means biases said one end of the arm into sliding engagement with said fixed pivot member.

6. A film advancing mechanism as defined in claim 5, wherein said pivot member has a face located in a plane extending substantially at right angles to said straight line and said one end of the arm is provided with a follower bearing against said face.

7. A film advancing mechanism as defined in claim 6, wherein said follower consists of synthetic plastic material.

8. A film advancing mechanism as defined in claim 1, wherein said pivot means comprises a link having a first end turnable about a fixed axis and a second end articulately coupled with said one end of the arm for angular movement about said pivot axis.

9. A film advancing mechanism as defined in claim 1, wherein said film engaging means is oscillatable in and counter to the direction of film travel and wherein said resilient means comprises a prestressed leaf spring whose curvature decreases in response to movement of said film engaging means in the direction of film travel.

10. A film advancing mechanism as defined in claim 1, wherein said film engaging means is oscillatable in and counter to the direction of film travel and wherein said resilient means comprises a prestressed leaf spring whose bias increases in response to movement of said film engaging means in the direction of film travel.

11. A film advancing mechanism as defined in claim 1, further comprising mounting means for said resilient means, said mounting means being adjustable in parallelism with said straight line.

12. A film advancing mechanism as defined in claim 11, wherein said pivot means is carried by said mounting means.

13. A film advancing mechanism as defined in claim 12, further comprising a housing supporting said oscillating means and said mounting means and defining a film channel extending in parallelism with said straight line, and adjusting means for moving said mounting means with reference to said housing.

14. A film advancing mechanism as defined in claim 1, wherein said film engaging means is located past the point of intersection of said straight line with a second line passing through said pivot axis and normal to said straight line.

References Cited
UNITED STATES PATENTS

| | | | |
|---|---|---|---|
| 2,152,624 | 4/1939 | Cazes | 226—73 |
| 2,552,457 | 5/1951 | Raskin | 226—73 |

M. HENSON WOOD, JR., *Primary Examiner.*

R. A. SCHACHER, *Assistant Examiner.*